US 12,488,182 B2

United States Patent
Wu (10) Patent No.: US 12,488,182 B2
(45) Date of Patent: Dec. 2, 2025

(54) SYSTEM AND METHOD FOR GENERATING EMBEDDINGS IN PRE-TRAINED TEXT DETECTION AND EXTRACTION NEURAL NETWORK MODEL AND FINE-TUNING THE SAME

(71) Applicant: Singularity Systems Inc., Princeton, NJ (US)

(72) Inventor: Tianhao Wu, Princeton Junction, NJ (US)

(73) Assignee: OPAIDA, INC., Princeton JCT, NJ (US)

( * ) Notice: Subject to any disclaimer, the term of this patent is extended or adjusted under 35 U.S.C. 154(b) by 360 days.

(21) Appl. No.: 18/115,156

(22) Filed: Feb. 28, 2023

(65) Prior Publication Data

US 2024/0289550 A1    Aug. 29, 2024

(51) Int. Cl.
*G06F 40/284* (2020.01)
*G06N 3/08* (2023.01)
*G06V 10/82* (2022.01)
*G06V 30/14* (2022.01)
*G06V 30/19* (2022.01)
*G06V 30/416* (2022.01)

(52) U.S. Cl.
CPC .......... *G06F 40/284* (2020.01); *G06N 3/08* (2013.01); *G06V 10/82* (2022.01); *G06V 30/1444* (2022.01); *G06V 30/19147* (2022.01); *G06V 30/416* (2022.01)

(58) Field of Classification Search
CPC ........ G06F 40/284; G06N 3/08; G06N 3/045; G06V 10/82; G06V 30/1444; G06V 30/19147; G06V 30/416
USPC .......................................................... 382/156
See application file for complete search history.

(56) References Cited

U.S. PATENT DOCUMENTS 11,625,934 B2 * 4/2023 Tiyyagura ............. G06F 40/295
382/112
2023/0386236 A1 * 11/2023 Rimchala ......... G06V 30/19173

* cited by examiner

*Primary Examiner* — Charlotte M Baker
(74) *Attorney, Agent, or Firm* — Zhong Law, LLC (57) ABSTRACT

A system and method for training a neural network model includes obtaining, by a processing device, a document image containing raw text, tokenizing the raw text in the document image to obtain tokens located in a plurality of rows, identifying a first token in one of the plurality of rows, calculating a horizontal language feature of the first token based on the first token and one or more tokens in the row, and encoding, using a first encoder, the horizontal language feature into a horizontal language embedding, calculating a vertical language feature of the first token based on the token and one or more tokens in rows above or below the row, and encoding, using a second encoder, the vertical language feature into a vertical language embedding, and training a neural network model using the horizontal language embeddings and the vertical language embeddings.

19 Claims, 9 Drawing Sheets

MACHINE LEARNING ENGINEER

Singularity Systems Inc. is an artificial intelligence company that delivers complex AI solutions to large businesses such as insurance companies, commercial banks, investment banks, and law firms. Established in 2019, the company has grown rapidly and has multiple projects undergoing. SingularityAI enables customers to quickly build and deploy highly accurate models with no coding involved. Our SingularityAI platform adds value by making data machine-consumable through Intelligent Document Processing, Intelligent Image Processing, and Predictive Analytics. We are now in rapid development and in need of engineers who have a strong background in software engineering and machine learning. Great opportunity and competitive salary/benefits/stock options are provided. Join us today as we create a better tomorrow.

Responsibilities:
- Finish machine learning use cases.
- Design and implement machine learning solutions for customer's projects
- Train/Test/Deploy/Maintain AI models
- Deploy machine learning solutions to customer's on-premise environments
- Develop NLP based software system
- Production Services
- Work with research team to improve the company's AI products

Requirements:
Must-have
- Master or higher Degree in Computer Science or equivalent
- Solid foundation in data structures and complex algorithms
- Experience with machine learning and natural language processing (NLP)
- Hands-on experience in coding, and familiar with Python, JavaScript, Node.JS, etc.
- Experienced in transfer learning/active learning/ GAN (Generative Adversarial Network)
- Experience in at least one deep learning framework such as TensorFlow, PyTorch
- Excellent verbal and written communication skills with English
- Ability to learn different technologies quickly

Nice to have:
- Experience in Text mining, deep learning, CV deep learning
- Experience in implementing transformers.

We Provide:
- Competitive salary/benefits/stock options
- A dynamic working environment on fast-growth path together with the company
- Diversified and tailored career paths 100 CANAL POINTE BLVD    PHONE 732-342-0199
       SUITE 209    EMAIL careers@singularitysystems.com
PRINCETON, NJ 08540 WEBSITE http://www.singularitysystems.com

SYSTEM AND METHOD FOR GENERATING EMBEDDINGS IN PRE-TRAINED TEXT DETECTION AND EXTRACTION NEURAL NETWORK MODEL AND FINE-TUNING THE SAME

TECHNICAL FIELD

The present disclosure relates to machine learning technologies in the context of document processing, and in particular, to a system and method for generating embeddings in pre-trained text detection and extraction neural network model and fine-tuning the same.

BACKGROUND

Neural networks are widely applied in machine learning tasks including the task of document understanding. The technology may be used to document classification and information extraction, document text content generation, and data simulation. The document can be in different file formats such as images, portable document format (PDF), MS Word/Excel/PowerPoint etc. Some of the use case examples include bank checks, invoices, receipts, legal documents, bank statements, tax forms, mortgage deeds etc. Commonly, the document may contain characters of one or more natural languages that are understandable by human readers. Traditionally, the document understanding tasks may include the training of an image model (e.g., a first neural network model) that may be used to generate results in the form of recognized characters from a document image containing these characters. Based on an assumption that the recognized characters are horizontally aligned, a text analytic model (e.g., a second neural network model) may be trained to detect text and extract information from the detected text horizontally. This approach ignores features other than the horizontally aligned text information and suffers low accuracy, slow and long training processes, the requirement of manual tuning after the training, and difficulty to scale the text analytic models to different applications.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

To overcome above-identified and other technical problems in analyzing document images, implementations of the disclosure provide a pre-trained neural network model that can be used by a user without any further training (i.e., the pre-trained neural network model can be used out of the box). Further, implementations of the disclosure provide a system and method to quickly fine-tune the pre-trained neural network model into a customized model that is more accurate for the user application. In this way, implementations of the disclosure achieve high accuracy, few shot learning, fast training speed, no code/no manual tuning of the neural network model, multi-language, and high scalability in constructing a neural network model for text analysis.

Document images may include images of bank checks, invoices, receipts, legal documents etc. In addition to the horizontally aligned text, these document images may also include other types of information that may help understand the document images. Examples of these types of information include vertical text information, computer vision information, character shape information, font feature information, table feature information, artifacts feature information etc. Implementations of the disclosure may calculate corresponding embeddings from the horizontal text information, vertical text information, computer vision information, character shape information, font feature information, table feature information, and artifacts feature information using encoding networks. Here, an embedding is a vector representation of the corresponding information. The embedding is commonly represented in a relatively low-dimensional space compared to the original information, thus reducing the computational complexity. Implementations of the disclosure may then provide the embeddings as inputs to a deep neural network module for analyzing the text in the document image in an efficient and accurate manner. The deep neural network module may be pre-trained on a large training dataset before releasing to an application user. The application user may obtain the pre-trained neural network module and apply the same to its document images without further training or with fine-tuning.

Thus, implementations of the disclosure may include a system and method of a deep neural network module whose architect may combine inputs including horizontal and vertical nature language processing embeddings, computer vision embeddings, character shape embeddings, font feature embeddings, table feature embeddings, and artifacts feature embeddings together for processing to achieve high accuracy, few shots learning, fast training speed, no code/no manual tuning of the neural network model, multi-language, and high scalability.

Figure 1:
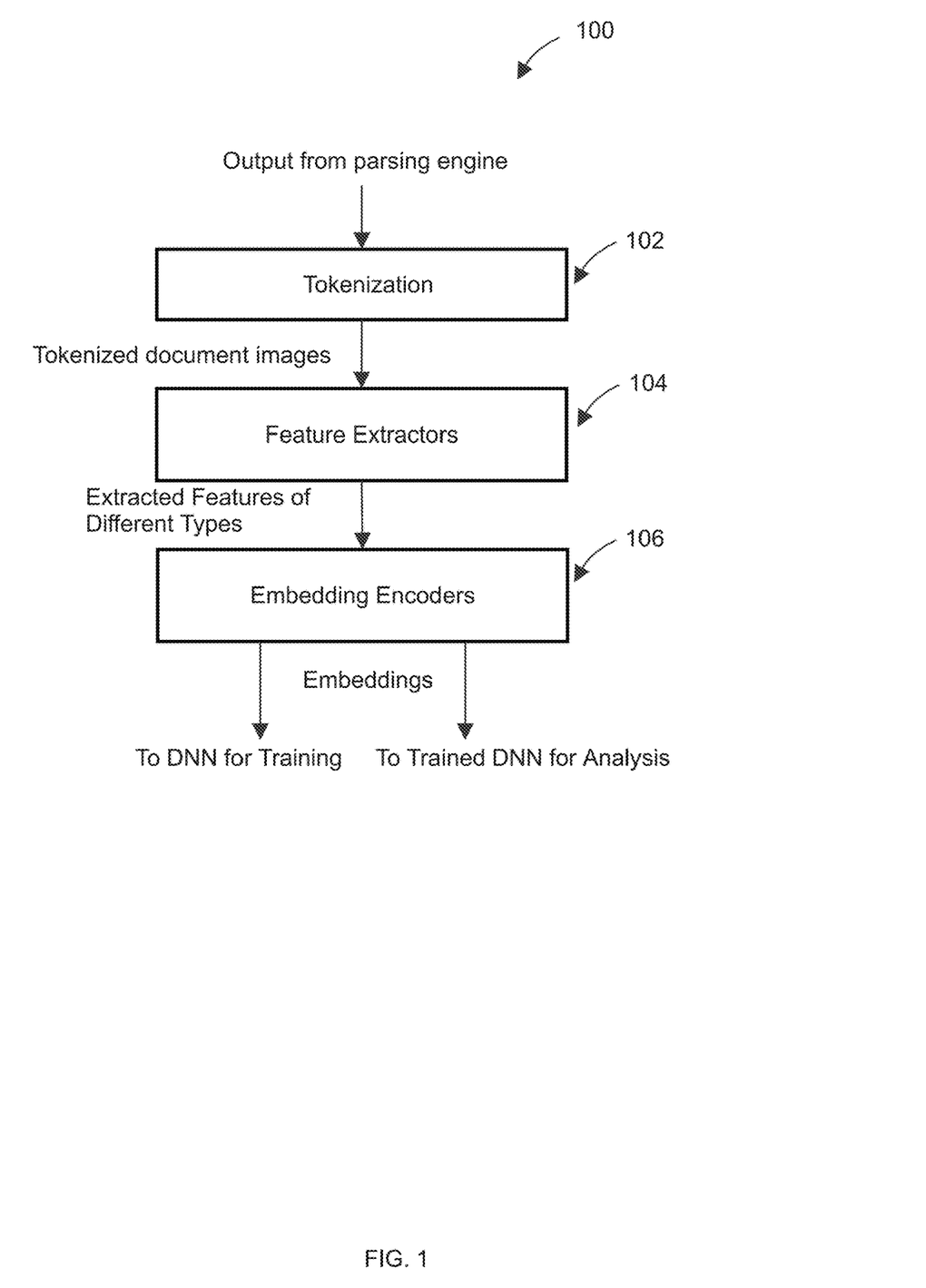
FIG. 1 illustrates a flowchart of a method for generating embeddings for a deep neural network according to an implementation of the disclosure.

FIG. 1 illustrates a flowchart of a method 100 for generating embeddings for a deep neural network according to an implementation of the disclosure. This method may be performed by a processing device of a computer system or in a computing cloud.

The input to method 100 in this disclosure can be a document image that has been processed by parsing engine (e.g., a PDF/MS Word/MS PowerPoint/MS Excel/HTML/

XML/Json parsing engine. The document may include lines of text (e.g., characters such as alphabets and other symbols) and regions of images (e.g., photos, graphics, barcodes). The output of the parsing engine may include recognized characters and/or symbols. Additionally, the output may include identified regions of images that are not recognized as characters or symbols by the parsing engine.

Referring to FIG. 1, at 102, the processing device may execute a tokenizer to perform tokenization operations on the recognized characters and/or symbols. The parsing engine may perform character recognition on a document image (or electronic document) and produce raw text. The raw text can be composed of characters (e.g., alphabets) of one or more natural languages (e.g., English, Chinese, French etc.), numbers, and any symbols (e.g., math symbols). The tokenization operations may group the characters and/or symbols in the raw text into small chunks referred to as tokens. The tokens can be words, phrases, sentences, or paragraphs. These tokens may help understand the context of text and develop model for the natural languages, and understand the meaning of the text. Implementations of the disclosure may employ a suitable tokenizer to perform tokenization. Examples of tokenizers may include NLTK tokenizer, Gensim tokenizer, and Keras tokenizer. The tokenization techniques may include white space tokenization (determining tokens based on white spaces), dictionary based tokenization (determining tokens based on one or more dictionaries), rule based tokenization (tokenization based on a set of rules, e.g., grammars), regular expression tokenization, and any other suitable tokenization techniques. Implementations of the disclosure may include tokenizer that may tokenize more than 50 natural languages, thus supporting a wide range of documents. The output of tokenization 102 are document images containing raw text that is broken down into tokens (e.g., words).

Responsive to producing tokens by the tokenizer, at 104, the processing device may further execute feature extractors to extract different types of features from tokens, and at 106, execute embedding encoders to encode the different types of features into embeddings. A type of features may correspond to a certain aspect of the document image. In one implementation, feature extractors may extract horizontal natural language (NL) features, vertical NL features, computer vision features, token shape features, font features, table features, and artifact features. These features may be encoded by corresponding embedding encoders into embeddings that may be provided to a neural network for training a neural network model or for analysis by a trained neural network model.

Figure 2:
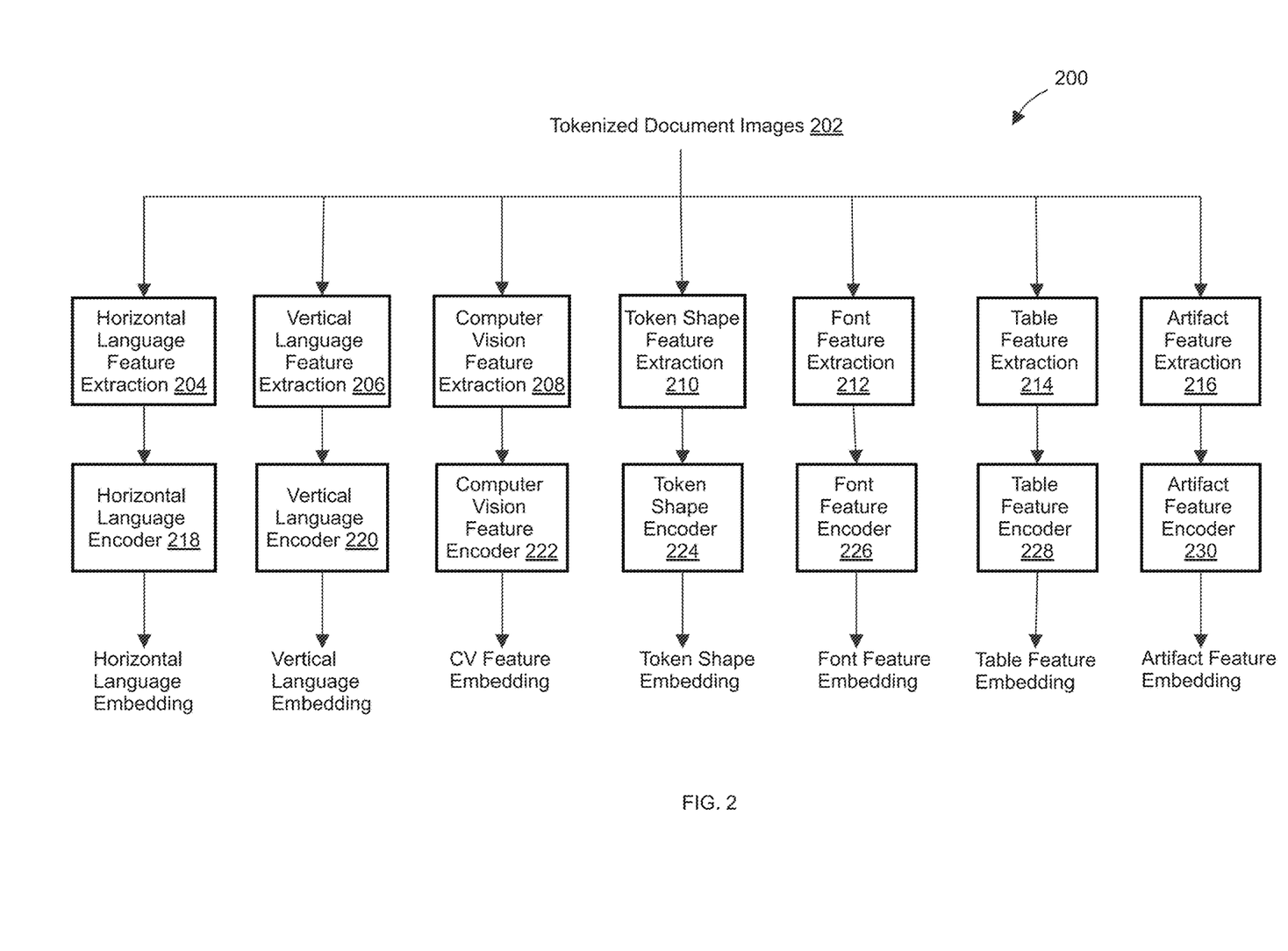
FIG. 2 illustrates a subsystem including feature extractions and embedding encoders in detail according to an implementation of the disclosure.

FIG. 2 illustrates a subsystem 200 including feature extractions and embedding encoders in detail according to an implementation of the disclosure. Subsystem 200 may receive tokenized document images 202 and generate different types of embeddings as discussed in the following.

Horizontal Language Feature and Embedding

The tokens (e.g., words, phrases, sentences recognized by the parsing engine) in a document image are commonly arranged in horizontal lines. A human reader may read the content horizontally from left to right and line by line. Referring FIG. 2, subsystem 200 may include horizontal language feature extraction 204 and horizontal language encoder 218. Horizontal language feature extraction 204 may identify features horizontally line by line. In one implementation, the horizontal language feature can be a token (e.g., a word, a group of words, or a sentence) or any aspects associated with the token (e.g., the meaning of the word), or a token and the context of the token as well as any aspects associated with the token and the context of the token.

Responsive to identifying horizontal language features, horizontal language encoder 218 may encode the horizontal language features into horizontal language embeddings. Horizontal language embeddings are vectors containing elements of numerical values representing information relating to the corresponding horizontal language features. In one implementation, the horizontal language feature may encode information of its context such as the preceding and following texts. In the situation where the feature is a token, the weights of other tokens within a sentence of the current token may assigned with a weight value that is consistent and a large numerical value (e.g., above a threshold value of 1). For those other tokens outside the sentence of the current token, the weights associated with these tokens outside the sentence of the current token may be assigned inversely proportional to the distance between the token and these tokens outside the sentence, where the weight may be a value in the range of (0, 1) decreasing logarithmically with distance. In this way, tokens within the sentence of the current token may weigh higher in the horizontal language embedding of the current token. In one implementation, the processing device may employ a cross-correlation matrix to store the weights of attention between tokens, thus reducing the amount of computation of weights.

Vertical Language Feature and Embedding

Current natural language processing models are exclusively focused on horizontal features and embeddings. In a wide range of applications, vertical language features may be useful in training a deep neural network model for document image processing. For example, in an invoice, the token above a numerical value may contain useful information about the category of the value. If only considering the horizontal language features, the meaning of the value may be incomplete or far away from the value. To overcome these deficiencies, implementations of the disclosure provide subsystem 200 that includes vertical language feature extraction 206 and vertical language encoder 220.

Figure 3:
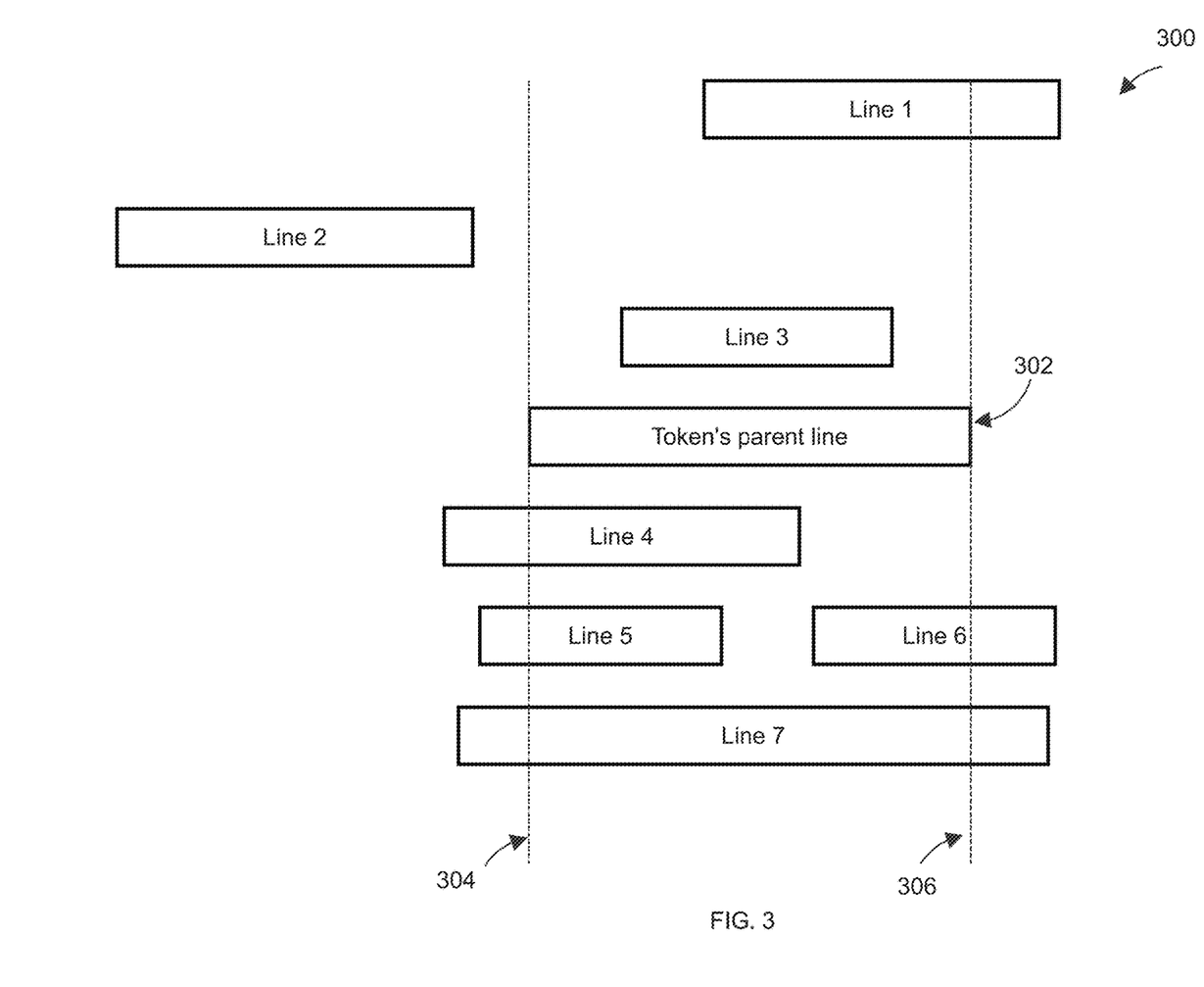
FIG. 3 illustrates an example for determining vertical language features.

In one implementation, to determine the vertical language features given a token and the line containing the token (referred to as the token's parent line), vertical language feature extraction 206 may determine a left endpoint and a right endpoint of the parent line of the token, and extend the left endpoint and the right endpoint upwards and downwards. The extension lines of the left endpoint and the right endpoint upwards and downwards may interact with lines above and below the parent line. In one implementation, any lines within the bound of or crossing the extension lines originated from the left endpoint and the right endpoint of the parent line upwards and downwards are considered as vertical language features that are relevant to the token. FIG. 3 illustrates an example 300 for determining vertical language features. As shown in FIG. 3, a token's parent line 300 may include a left endpoint and a right endpoint. A first vertical extension line 304 may be extended from the left endpoint upwards and downwards, and a second vertical extension line 306 may be extended from the right endpoint upwards and downwards. The lengths of vertical extension lines 304 and 306 may be pre-determined. For example, the lengths may span over a certain number of lines in both the upward and downward directions. In this example 300, any lines within the bounds of and/or crossing these two vertical extension lines 304, 306 may provide context to the token's parent line 302. Thus, lines 1, 3, 4, 5, 6 and 7 may provide context to token parent line 302, but line 2 does not provide context because line 2 is outside the bound of the vertical extension lines 304, 306.

In one implementation, all the context lines (e.g., lines 1, 3, 4, 5, 6 and 7) may be sorted into an order. For example, the lines may be sorted according to their top left corner's Y coordinate value, and those lines with identical top left corner's Y coordinate can be sorted according to their top left corner's X coordinate value. The sorted context lines may be combined according to their order into a feature vector. In one implementation, all context vectors may be rotated anticlockwise by 90 degrees to line up a vertical feature vector.

Referring to FIG. 2, upon forming the feature vector representing the vertical language features, vertical language encoder 220 may encode the vertical language features into embeddings in an encoding manner similar to that of horizontal language encoder 218. The output of vertical language encoder 220 may be vertical language embeddings.

Computer Vision Feature and Embedding

A token in the document image may be represented by an image region such as, for example, a greyscale image, a binary image, or a color image. The image region of the token may be associated with computer vision features that reflect Subsystem 200 may include computer vision (CV) feature extraction 208 to extract CV features and include a CV feature encoder 222 to encode the CV features into CV feature embeddings.

In one implementation, CV feature extraction 208 may first identify image regions that each is associated with one or more tokens. The identification of image regions may include identifying the token positions in the tokenized document images 202. These token positions can be a byproduct of the parsing engine. Further, the identification of image regions may include cropping the image region surrounding the one or more tokens out of the corresponding document image. Depending on the nature of the document images, the image regions can be grey scale, binary, or color image. The cropping may ensure the full coverage of the one or more tokens. This may achieve the identification of the image regions covering the current token and its horizontal and/or vertical context tokens.

Figure 4:
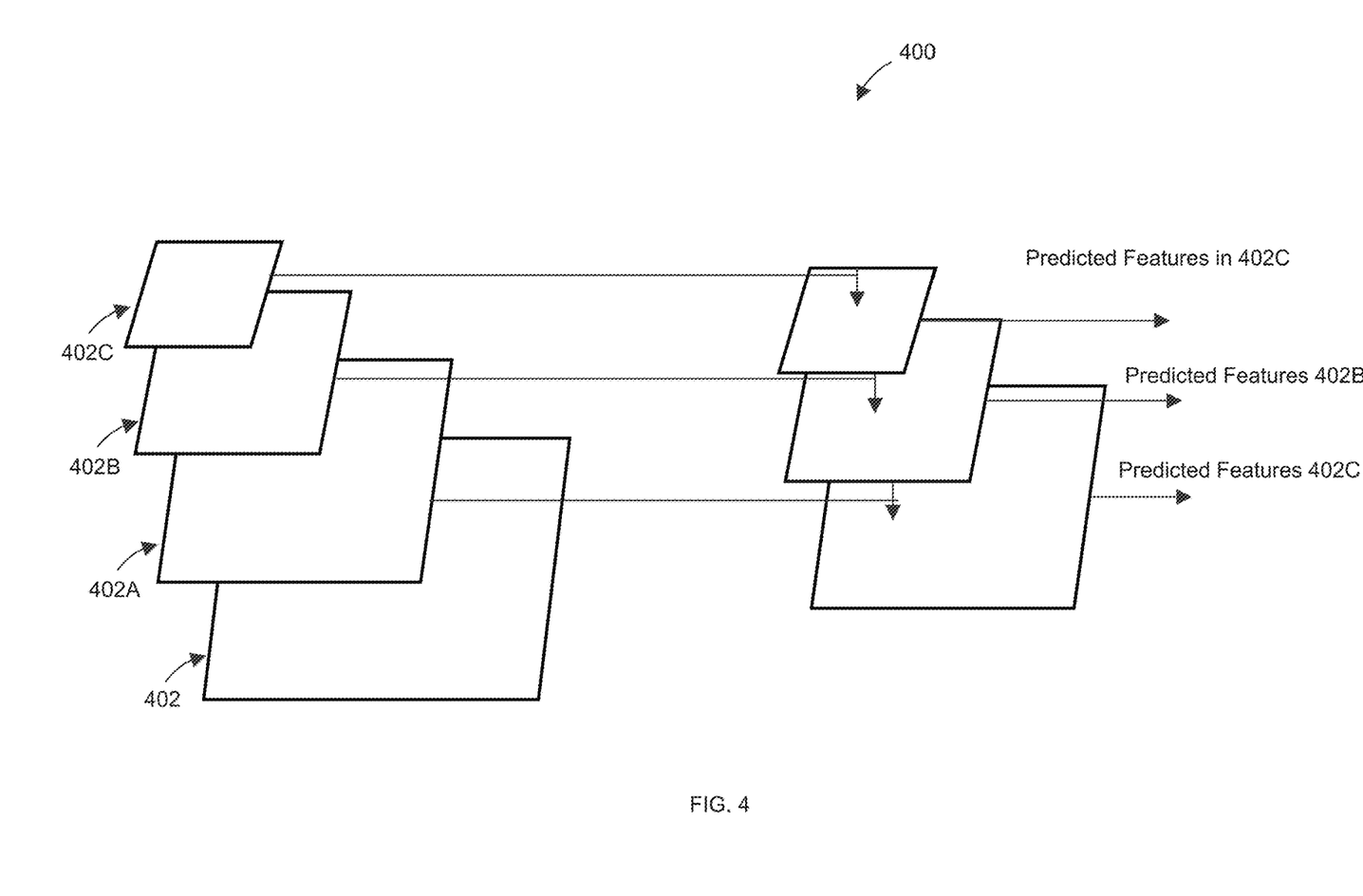
FIG. 4 shows a decomposition of an image region I into a stack of lower resolution images.

Responsive to identifying image regions that cover one or more tokens, CV feature extraction 208 may extract CV features from the image regions. In one implementation, for a given image region I, CV feature extraction 208 may first resize image region I into a predetermined resolution (e.g., 224 pixels by 224 pixels), and then decompose the resized image region I using a feature pyramid network into a stack of lower-resolution images of progressively lower image resolutions. FIG. 4 shows a decomposition of an image region I into a stack of lower resolution images. As shown in FIG. 4, an image region 402 may be decomposed into a stack of lower-resolution images 402A, 402B, 402C, where image 402A may be obtained by applying a low-pass filter to image 402 and subsampling the low-passed 402; image 402B may be obtained by applying a low-pass filter to image 402A and subsampling the low-passed 402A; image 402C may be obtained by applying a low-pass filter to image 402B and subsampling the low-passed 402B.

CV feature extraction 208 may identify positions of tokens and the regions covering these tokens in image 402A, 402B, 402C. The positions of a token may include the center position and the vertices of a bounding box surrounding the token. For a given token, the image region covering the token in the stack of images 402A, 402B, 402C may be identified and merged into a CV feature vector for the token.

Thus, the CV feature may be composed of pixel values in multiple lower-resolution images of the token. Responsive to determining CV features, CV feature encoder 222 may encode the CV features associated with the tokens into CV feature embeddings. In this way, CV features of tokens can be encoded into CV feature embeddings which may have a much lower dimensionality than CV features.

Token Shape Feature and Embedding

Tokens (e.g., in Latin languages) may be associated with certain shape patterns. These shape pattern may constitute token shape features that may be encoded into token shape embeddings. Referring to FIG. 2, subsystem 200 may include token shape feature extraction 210 and token shape feature encoder 224.

The token shape features may include upper case, lower case, number, punctuation shape etc. Token shape feature extraction 210 may extract shape features from tokens to produce token shape feature vectors. For example, a token of "Inv-123" may be represented by "Xxpn," where "X" represents upper case character(s), "x" represents lower case character(s), "p" represents punctuation(s), "n" represents number(s) etc. In this way, token shape feature extraction 210 may extract shape feature vectors of tokens. Responsive to obtaining the shape feature vectors of tokens, token shape feature encoder 224 may encode these shape feature vectors into token shape embeddings which may have much lower dimensionality than shape feature vectors.

Font Feature and Embedding

The parsing engine that processes the document images may also provide additional font-related features for tokens. To this end, subsystem 200 may include font feature extraction 212 and font feature encoder 226. The parsing engine may identify lines, paragraphs etc. in a document image. For each token, font feature extraction 212 may identify the line and paragraph in which the token belongs, and the previous lines and following lines. Similarly, the parsing engine may also identify the previous paragraphs and following paragraphs with respect to the current paragraph in which the token is located. The parsing engine may also identify the token's color, token's font family, token's font size, token's prominence (e.g., italic, bold, all caps), and other aspects of the font (e.g., font accuracy scores). All these pieces of font information may be combined to form the font feature vector associated with a token. Font feature encoder 226 may encode font features vectors into font feature embeddings.

Table Feature and Embedding

Document images may often include tables. A table may include tokens that are organized according to their characteristics. Subsystem 200 may include table feature extraction 214 and table feature encoder 228. Table feature extraction 214 may first identify a table in the document image. Further, table feature extraction 214 may determine the table location (e.g., a polygon of the table's outer shape), the columns and rows of the table, the column number, column span number, row number, and row span number as features associated with the table. Table feature encoder 228 may encode table feature vectors into table feature embeddings.

Artifact Feature and Embedding

Besides the main text, a document image may also include logos, signatures, stamps (or seals), barcodes etc. These artifacts may also occupy areas in the document image. These areas are referred to as artifacts. Subsystem 200 may include artifact feature extraction 216 and artifact feature encoder 230.

In one implementation, artifact feature extraction 216 may first identify types of these artifacts and the bounding boxes that surrounding the artifacts. The artifacts typically do not have corresponding texts. They can be represented as follows:

Logo→ⓁⓁⓁ, where Ⓛ is (U+24C1)
Signature→ⓈⓈⓈ, where Ⓢ is (U+24C8)
Stamp→ⓉⓉⓉ, where Ⓣ is (U+24C9)
Barcode→ⒷⒷⒷ, where Ⓑ is (U+24B7)

Figure 5:
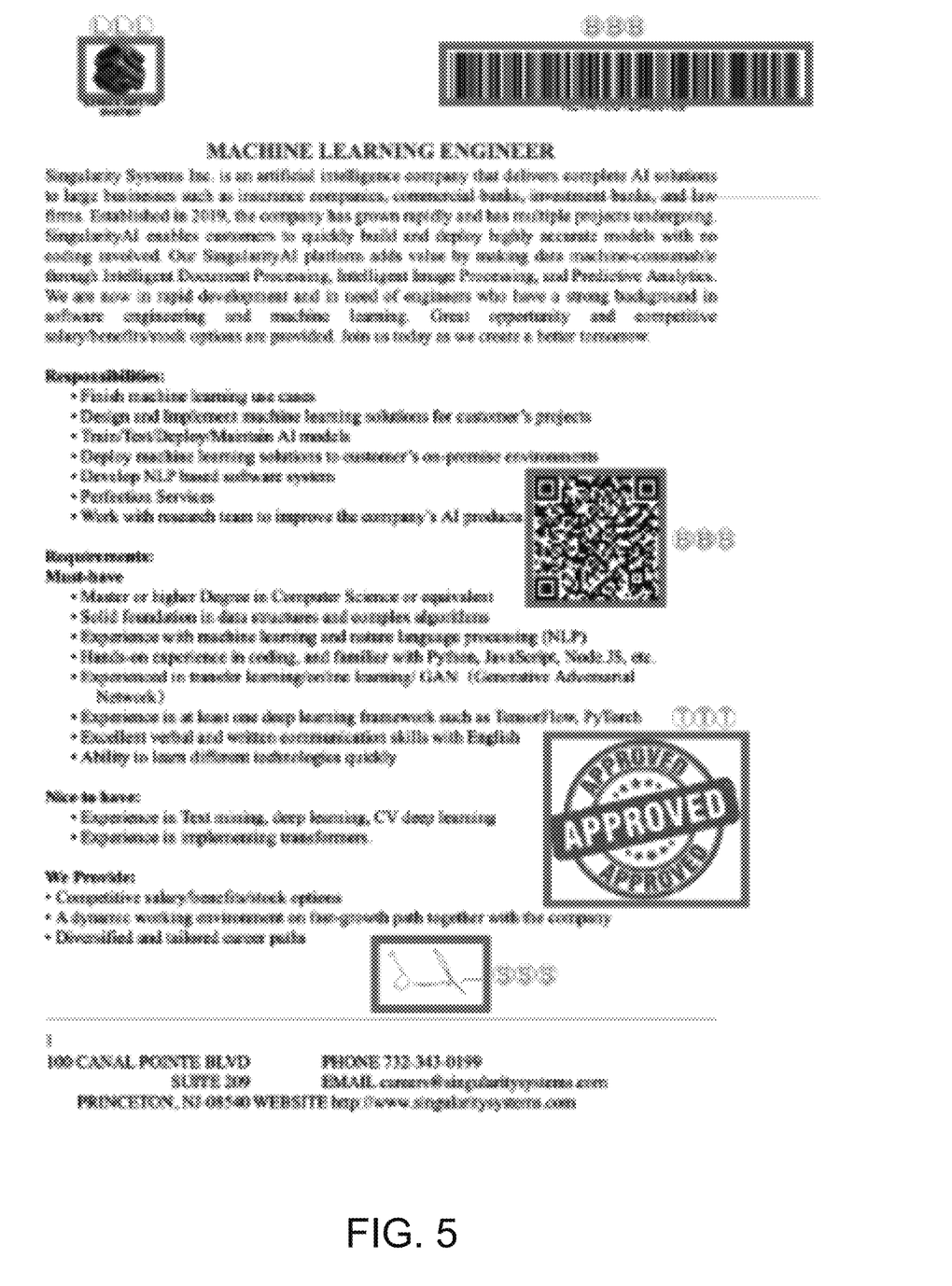
FIG. 5 shows an example document including artifacts identified according to their types.

FIG. 5 shows an example document including artifacts identified according to their types. Artifact feature extraction 216 may the bounding box (or bounding polygon) for each artifact area. The outer shape and attribute values (e.g., the center and four corners) may form the features associated with an artifact area. Responsive to obtaining artifact features, artifact feature encoder 230 may encode artifact features into artifact feature embeddings.

Figure 6:
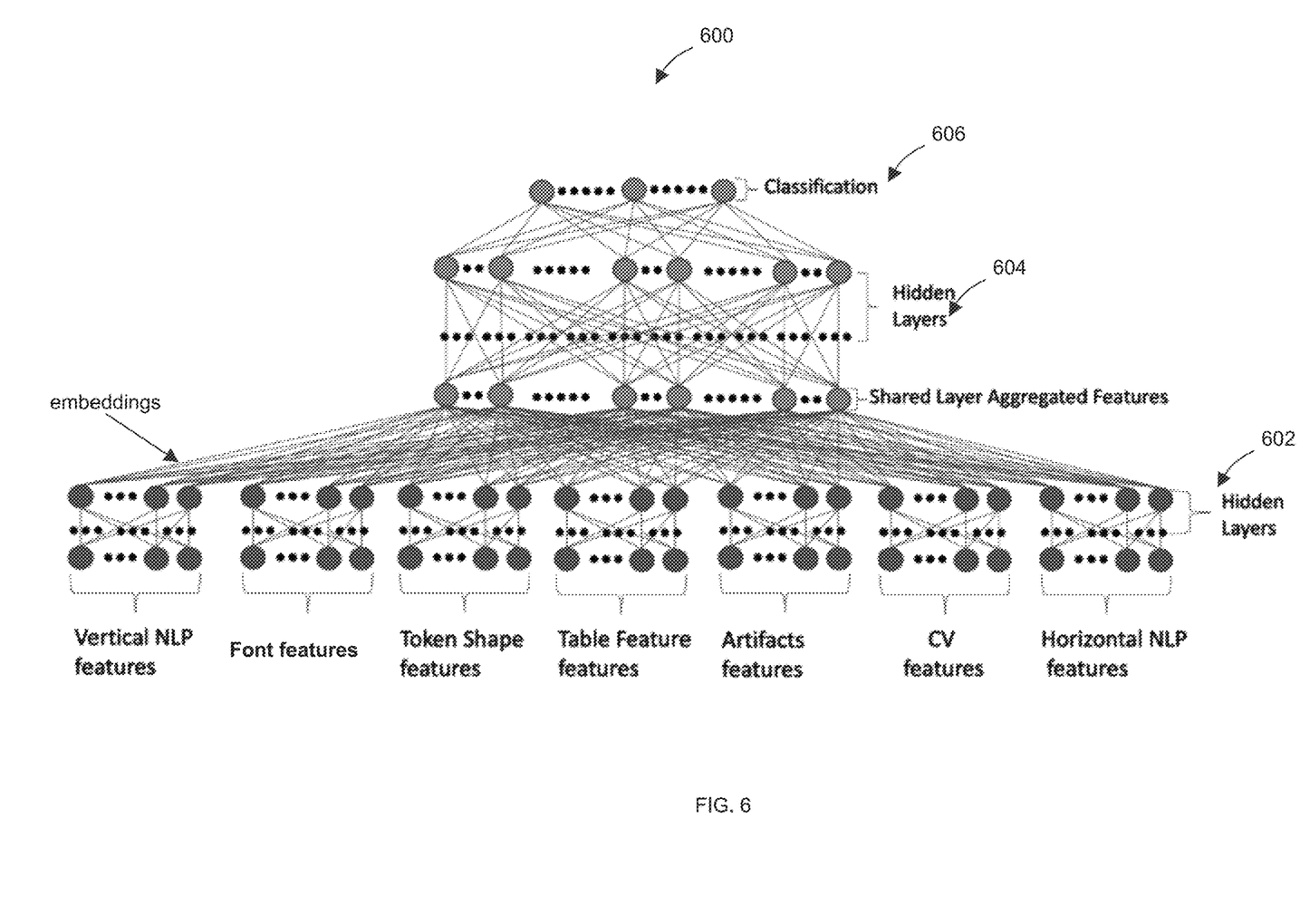
FIG. 6 shows a neural network system including an encoder layer and a neural network model according to an implementation of the disclosure.

The encoders 218-230 may be implemented using encoding neural networks having hidden layers. FIG. 6 shows a neural network system 600 including an encoder layer and a neural network model according to an implementation of the disclosure. As shown in FIG. 6, neural network system 600 may include an encoder layer 602 and a neural network model including hidden layers 604 and a classification layer 606. In one implementation, encoder layer 602 may include encoder subnetworks for encoding different types of features into feature embeddings. As shown in FIG. 6, encoder layer 602 may include a first subnetwork for encoding horizontal language features into horizontal language embeddings, a second subnetwork for encoding vertical language features into vertical language embeddings, a third subnetwork for encoding CV features associated with tokens into CV feature embeddings, a fourth subnetwork for encoding font features into font feature embeddings, a fifth subnetwork for encoding token shape features into token shape embeddings, a sixth subnetwork for encoding table features into table feature embeddings, and a seventh subnetwork for encoding artifact features into artifact feature embeddings. These subnetworks in encoder layer 602 may each include one or more hidden layers whose parameters may be trained to produce the embedding vectors from feature vectors.

While FIG. 6 shows seven encoder subnetworks in encoder layer 602 for illustration, it is understood that the encoder layer 602 may include a selection of any combination of these encoder subnetworks without requiring all of them. For example, encoder layer 602 may provide one or more of the subnetworks such as the second subnetwork for encoding the vertical language features into vertical language embeddings, or the combination of the first subnetwork for encoding the horizontal language features and the second subnetwork.

The embeddings generated by encoder layer 602 may be provided to a neural network model. Referring to FIG. 1, the embeddings if generated from a train dataset may be used for training a deep neural network to produce a pretrained deep neural network. An end user may deploy the pretrained deep neural network out of box without requirement for further training.

When deployed with an end user, a parsing engine may first process a document image to generate a raw text. Then, a tokenizer may create tokens from the raw text. Feature extractors may extract different types of features based on the tokenized document image, and encoders may encode these features into embeddings that may be fed into the trained deep neural network for further analysis.

Referring to FIG. 6, embeddings generated by subnetworks in encoder layer 602 may be fed into the neural network model. The neural network model may include hidden layers 604 including an input layer to receive the embeddings. The input layer may include nodes that each aggregates embeddings from different features together.

During a training process, the embeddings may be generated from a training dataset (e.g., pre-labeled document images). The neural network model may be initiated with parameters (e.g., the weight assigned to edges that connect nodes between hidden layers). The embeddings may propagate forward from the input layer through hidden layers 604 to an output layer, and then finally to a classification layer 606. The classification layer 606 may generate a classification result. During the training process, the classification result may be compared to a target result for the training dataset to calculate a difference between the classification result and the target result. During a backpropagation process, one or more parameters of the neural network model may be adjusted based on the difference (or error) between the classification result and the target result. This training process may be performed iteratively until the difference between the classification result and the target result reaches within a tolerance range, thus achieving a pretrain deep neural network.

Because the pretrained deep neural network was trained using a rich set of features based on tokens in document images, the pretrained deep neural network can be used out of the box by the end user without further training. However, in some applications, it may be desirable for the end user to perform a quick fine-tuning of the pretrained deep neural network so that the deep neural network is customized for the end user's need and produce more accurate results.

Figure 7:
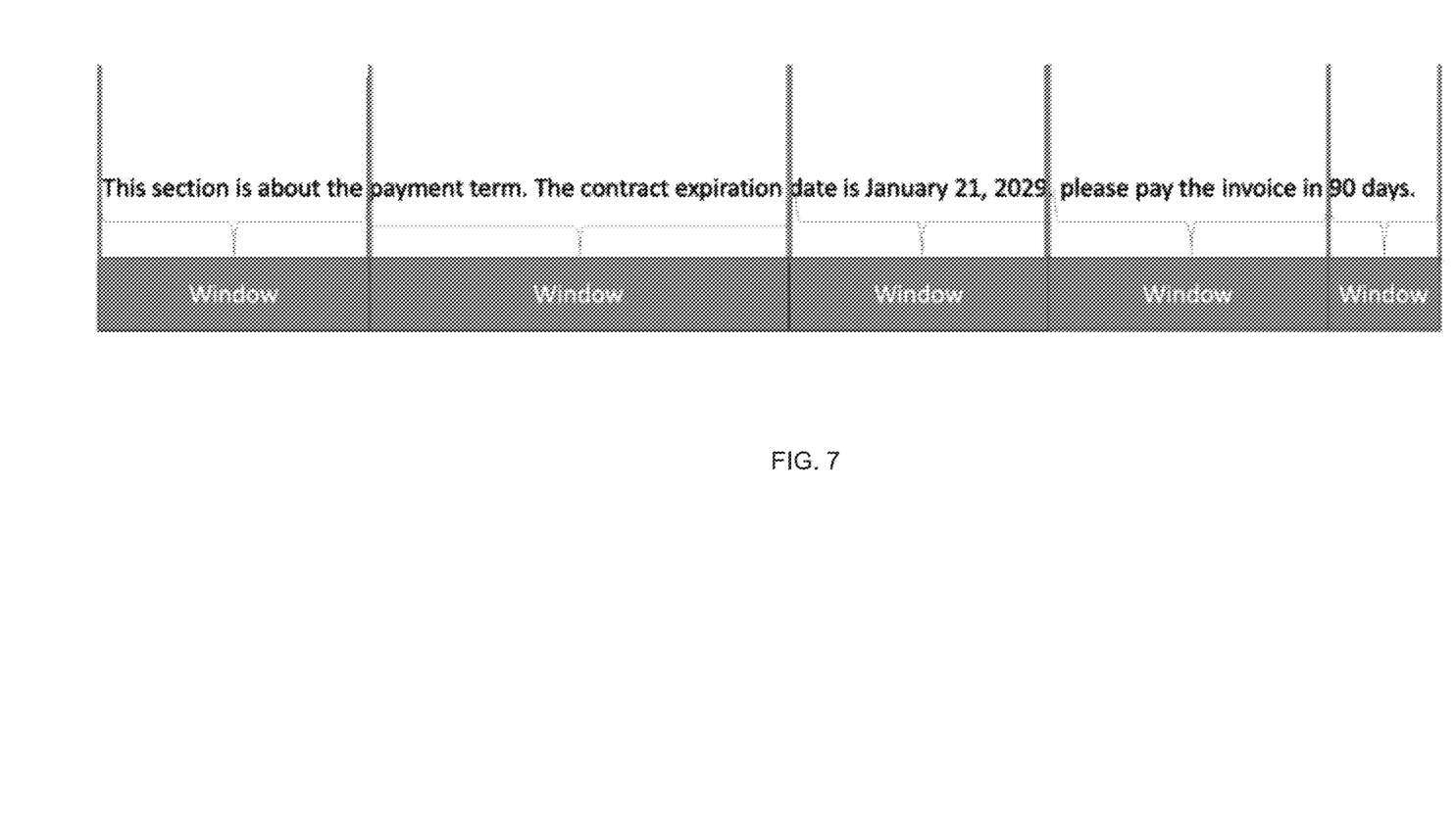
FIG. 7 shows a document split by windows of size 5.

When fun-tuning at the end user side, one of the issues in the real world application of text detection is not having enough labeled data. To overcome this problem, implementations of the disclosure may use a window (that covers a certain number of tokens) to split each page of a document into multiple smaller pieces, and each small piece may become the input document of the deep learning neural network model. The implementations may use different window size from 50 to 300 tokens with step=30, (the start/end/step of a window range can be customized by the end user). Therefore, a single-page document may generate many input documents (use window 50 to split the page, use 80 to split the page, etc.). This window split with stride approach may be used both in training and validation data that are split in the same way. This is data augmentation to boost the training and validation datasets. Experiments show that the window split make the final model very robust to the context changes of the use cases. FIG. 7 shows a document split by windows of size 5. In practical applications, the actual window size usually starts from 50 or more.

Another issue in the window split approach is that the beginning of a window does not have enough context about the previous text. If the key indication of a value is beyond the beginning of a window, the neural network model may not be able to learn it. To overcome this problem, implementations of the disclosure may add certain number of tokens as the prefix (referred to as the prefix-stride) to the window. In this way, the model can obtain the information in the prefix-stride at the head of a window. The tokens in prefix-stride do not participate in the information extraction (or classification). Similarly for the end of a window, the implementations may add a suffix of context (suffix-stride) at a tail of a window to bring more context for the model to better understand the tokens in the window. But both the prefix-stride and the suffix-stride (the head and tail) are not included for information extraction or classification.

Implementations may apply different sizes of windows on both training and validation datasets. To select the best checkpoint, the user can specify the number of iterations or epochs and specify how many iterations and epochs to evaluate. For example, the user may specify the max iteration of 50000 steps, and run evaluation (checkpoint) for every 500 steps. The platform also sets common defaults. At the same time of model training, the framework evaluates the model's checkpoint using the full validation dataset, and only keeps the current best checkpoint and the last checkpoint. Each checkpoint may be a model itself. During the evaluation, the loss of all windows (with stride) in the validation set will become the evaluation criterion.

To save evaluation time, implementations may select the best window for the best checkpoint instead of obtaining the best value among all checkpoints and windows. Often the effects of these two choices are almost the same. When selecting the best window, the end user may separate the dataset according to the size of window and calculated f1 score respectively. Although each window contains stride during prediction, the stride part is removed when calculating f1 score while only window (without stride) is kept, ensuring that the f1 score obtained is the same as the prediction result returned to the user, thereby achieving the best window for user prediction.

Implementations may convert billions of documents with more than 50 different human languages into pure text, and then train its own tokenizer and vocabulary. It uses 1 million tokens as an upper limit. The final vocabulary trained contains 335,160 tokens.

Figure 8:
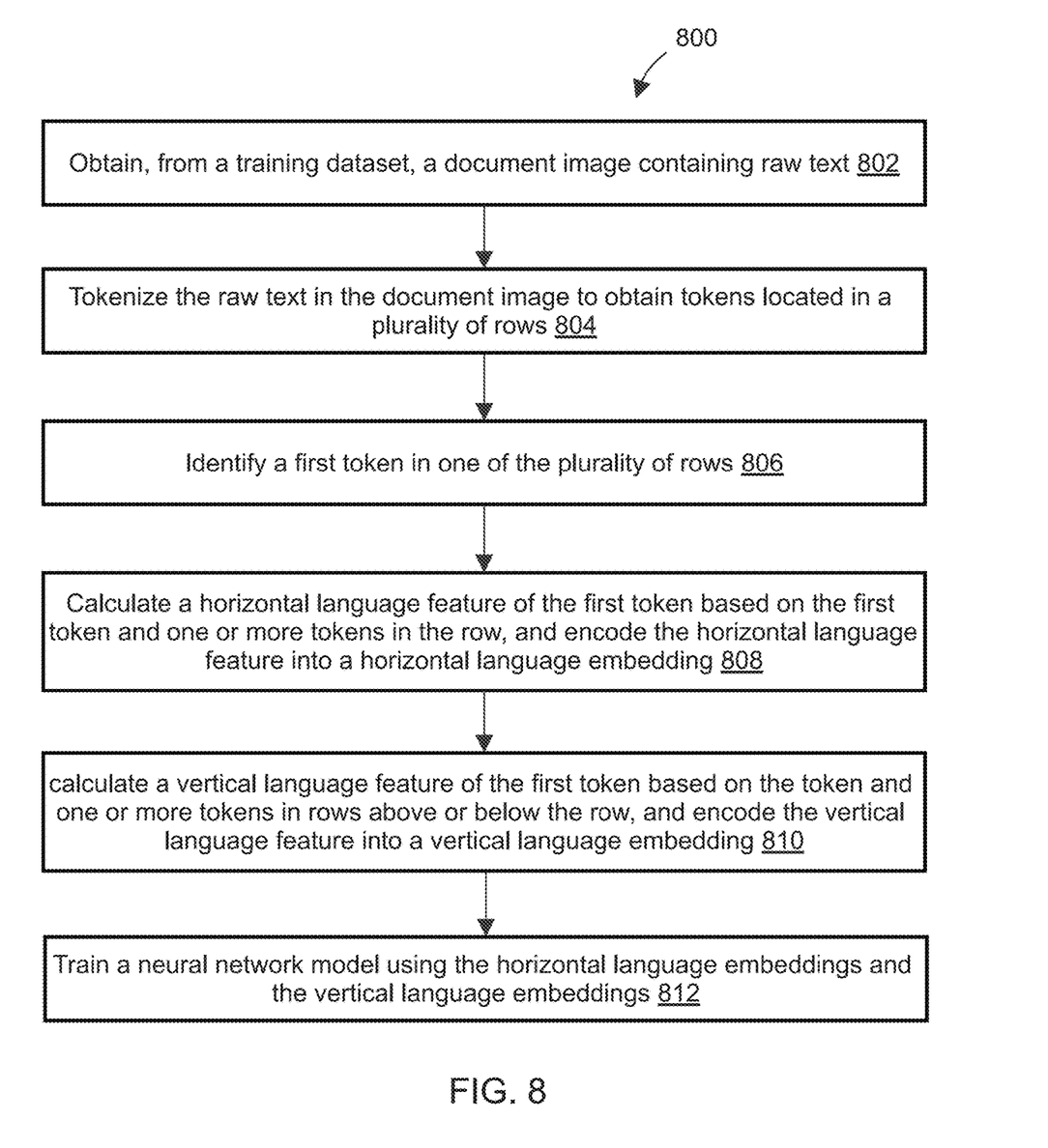
FIG. 8 illustrates a flowchart of a method for training a neural network according to an implementation of the disclosure.

FIG. 8 illustrates a flowchart of a method 800 for training a neural network according to an implementation of the disclosure. Method 800 includes operations that may be performed by a processing device that may comprise hardware (e.g., circuitry, dedicated logic), computer readable instructions (e.g., run on a general purpose computer system or a dedicated machine), or a combination of both. Method 200 and each of its individual functions, routines, subroutines, or operations may be performed by one or more processors of the computer device executing the method. In certain implementations, method 800 may be performed by a single processing thread. Alternatively, method 800 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 8, a processing device may, at 802, obtain, from a training dataset, a document image containing raw text. The raw text may be the result of the document image being processed by a parsing engine.

At 804, the processing device may tokenize the raw text in the document image to obtain tokens located in a plurality of rows. The tokens can be words, phrases, or sentence.

At 806, the processing device may identify a first token in one of the plurality of rows for calculate embeddings associated with the first token. These embeddings are vectors in a lower dimension and therefore, are more suitable for quick and accurate neural network processing.

At 808, the processing device may calculate a horizontal language feature of the first token based on the first token and one or more tokens in the row, and encode, using a first encoder, the horizontal language feature into a horizontal language embedding.

At 810, the processing device may calculate a vertical language feature of the first token based on the token and one or more tokens in rows above or below the row, and encode, using a second encoder, the vertical language feature into a vertical language embedding.

At 812, the processing device may train a neural network model using the horizontal language embeddings and the vertical language embeddings. The trained neural network model may be provided to an end user for use out of the box without further training.

Figure 9:
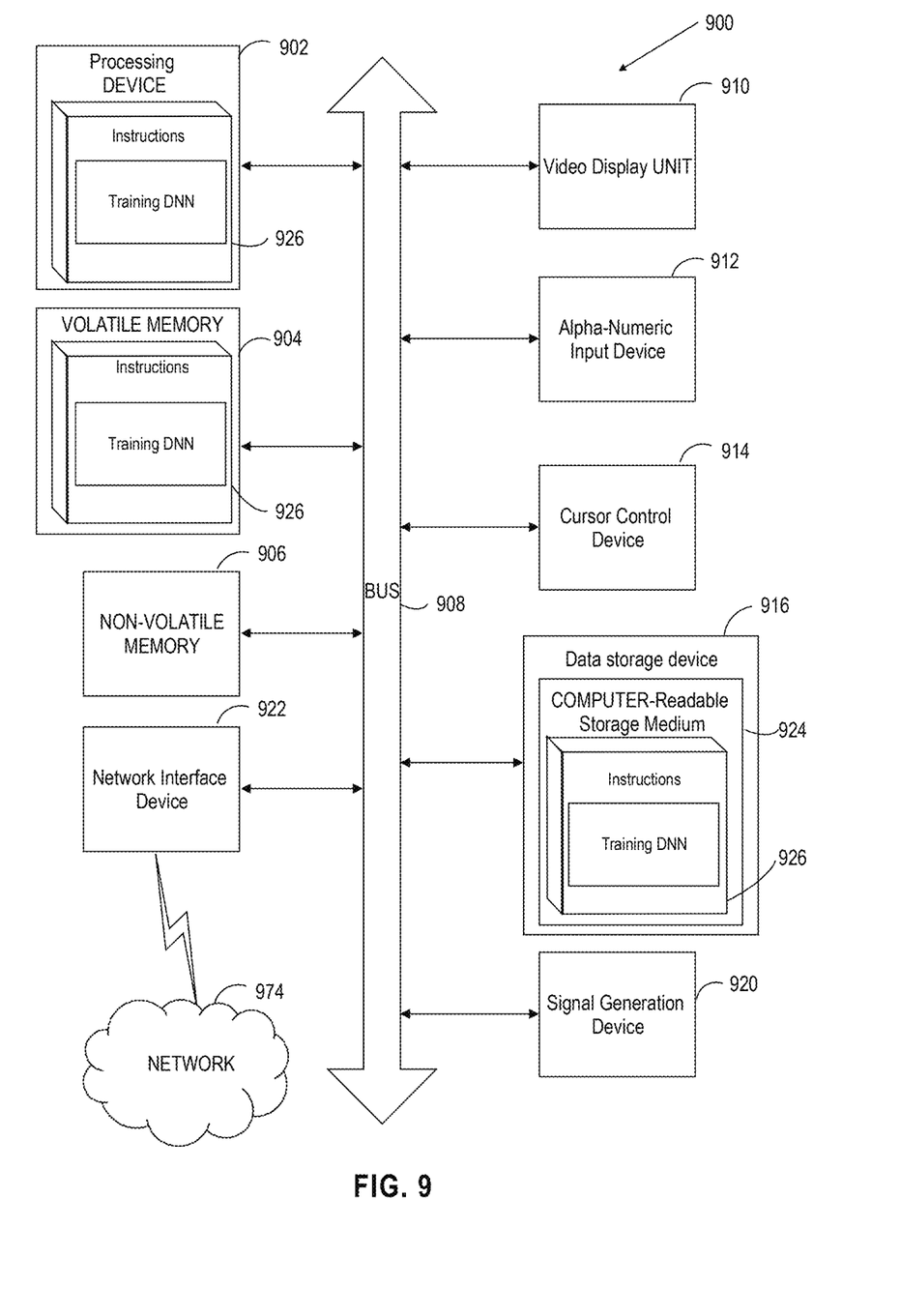
FIG. 9 depicts a block diagram of a computer system operating in accordance with one or more aspects of the present disclosure.

FIG. 9 depicts a block diagram of a computer system operating in accordance with one or more aspects of the present disclosure. In various illustrative examples, computer system 900 may correspond to the processing device discussed throughout the disclosure.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system implemented by one or more computers for training a neural network, the one or more computers comprising:
    a storage device; and
    a processing device, communicatively connected to the storage device, to:
        obtain, from a training dataset, a document image containing raw text;
        tokenize the raw text in the document image to obtain tokens located in a plurality of rows;
        identify a first token in one of the plurality of rows;
        calculate a horizontal language feature of the first token based on the first token and one or more tokens in the row, and encode, using a first encoder, the horizontal language feature into a horizontal language embedding;
        calculate a vertical language feature of the first token based on the token and one or more tokens in rows above or below the row, and encode, using a second encoder, the vertical language feature into a vertical language embedding; and
        train a neural network model using the horizontal language embeddings and the vertical language embeddings, wherein the neural network model comprises an input layer, hidden layers, and a classification layer, and wherein to train the neural network model, the processing device is further to:
        feed the horizontal language embedding and the vertical language embedding to the input layer;
        propagate the horizontal language embedding and the vertical language embedding from the input layer to the classification layer;
        determine a difference between an output result of the neural network model and a target result;
        adjust one or more parameters of the neural network model based on the difference; and
        iteratively perform training until the difference is within a tolerance range.

2. The system of claim 1, wherein the tokens comprise at least one of a word, a phrase, a sentence, or a paragraph.

3. The system of 1, wherein to calculate the horizontal language feature, the processing device is further to:
    identify a horizontal context of the first token, wherein the horizontal context comprises one or more tokens preceding or following the first token in the row;
    assign a respective weight value to each token in the horizontal context; and
    calculate the horizontal feature based on the first token, the horizontal context of the first token, and the respective weight value to each token in the horizontal context.

4. The system of claim 1, wherein to calculate a vertical language feature of the first token based on the token and one or more tokens in rows above or below the row, the processing device is further to:
    determine a width range of a line that contains the first token;
    extend the width range of the line upwards and downwards to identify a vertical context of the first token, wherein the vertical context comprises lines above or below the line that contains the first token and having at least a portion within the width range;

sort the lines in the vertical context according to a corner coordinate; and form the vertical language features based on the sorted lines in the vertical context.

5. The system of claim 1, wherein the processing device is further to:

identify an image region in the document image, the image region containing the first token;

calculate a computer vision feature of the token based on a pyramid multiresolution representation of the image region;

encode, using a third encoder, the computer vision feature of the token into a computer vision embedding; and train the neural network model further using the computer vision embedding.

6. The system of claim 1, wherein the processing device is further to:

determine a token shape feature of the first token, wherein the token comprises one or more characters, and the token shape feature comprises a shape representation associated with each of the one or more character;

encode, using a fourth encoder, the token shape feature into a token shape embedding; and train the neural network model further using the token shape embedding.

7. The system of claim 1, wherein the processing device is further to:

determine a font feature associated with the token, wherein the font feature comprises at least one of a row number to which the first token belongs, a paragraph number to which the first token belongs, row numbers for rows above or below the row to which the first token belongs, paragraph numbers for paragraphs preceding or following the paragraph to which the token belongs, token's color, token's font family, token's font size, or token's prominence;

encode, using a fifth encoder, the font feature into a font embedding;

train the neural network model further using the font embedding.

8. The system of claim 1, wherein the processing device is further to:

determine that the first token belongs to a table;

calculate a table feature associated with the table, the table feature comprising at least one of table's outer shape, a number of columns, a number of rows, a column span, or a row span;

encode, using a sixth encoder, the table feature into a table embedding; and train the neural network model further using the table embedding.

9. The system of claim 1, wherein the processing device is further to:

identify an artifact area in the document image, wherein the artifact area comprises at least one of a logo, a signature, a stamp, or a barcode;

determine an artifact feature associated with the artifact area, wherein the artifact feature comprises at least one of a shape attribute of an outer shape surrounding the artifact area;

encode, using a seventh encoder, the artifact feature into an artifact embedding; and train the neural network model further using the artifact embedding.

10. The system of claim 1, wherein the processing device is further to divide a document image in the training dataset into overlapping windows, and use tokens within the overlapping windows as a piece of training document image.

11. The system of claim 10, wherein the processing device is further to add a prefix and suffix to each window.

12. The system of claim 1, wherein the processing device is further to provide the trained neural network model to an end user.

13. A machine-readable non-transitory storage media encoded with instructions that, when executed by one or more computers, cause the one or more computer to train a neural network, to:

obtain, from a training dataset, a document image containing raw text;

tokenize the raw text in the document image to obtain tokens located in a plurality of rows;

identify a first token in one of the plurality of rows;

calculate a horizontal language feature of the first token based on the first token and one or more tokens in the row, and encode, using a first encoder, the horizontal language feature into a horizontal language embedding;

calculate a vertical language feature of the first token based on the token and one or more tokens in rows above or below the row, and encode, using a second encoder, the vertical language feature into a vertical language embedding; and train a neural network model using the horizontal language embeddings and the vertical language embeddings, wherein the neural network model comprises an input layer, hidden layers, and a classification layer, and wherein to train the neural network model, the one or more computer is further to:

feed the horizontal language embedding and the vertical language embedding to the input layer;

propagate the horizontal language embedding and the vertical language embedding from the input layer to the classification layer;

determine a difference between an output result of the neural network model and a target result;

adjust one or more parameters of the neural network model based on the difference; and iteratively perform training until the difference is within a tolerance range.

14. A method for training a neural network, the method comprising:

obtaining, by a processing device, a document image containing raw text;

tokenizing the raw text in the document image to obtain tokens located in a plurality of rows;

identifying a first token in one of the plurality of rows;

calculating a horizontal language feature of the first token based on the first token and one or more tokens in the row, and encoding, using a first encoder, the horizontal language feature into a horizontal language embedding;

calculating a vertical language feature of the first token based on the token and one or more tokens in rows above or below the row, and encoding, using a second encoder, the vertical language feature into a vertical language embedding; and training a neural network model using the horizontal language embeddings and the vertical language embeddings, wherein the neural network model comprises an input layer, hidden layers, and a classification layer, and wherein training the neural network model further comprising:

feeding the horizontal language embedding and the vertical language embedding to the input layer;

propagating the horizontal language embedding and the vertical language embedding from the input layer to the classification layer;

determining a difference between an output result of the neural network model and a target result;

adjusting one or more parameters of the neural network model based on the difference; and iteratively performing training until the difference is within a tolerance range.

15. The method of claim 14, wherein the tokens comprise at least one of a word, a phrase, a sentence, or a paragraph.

16. The method of claim 14, wherein calculating a horizontal language feature further comprises:

identifying a horizontal context of the first token, wherein the horizontal context comprises one or more tokens preceding or following the first token in the row;

assigning a respective weight value to each token in the horizontal context; and calculating the horizontal feature based on the first token, the horizontal context of the first token, and the respective weight value to each token in the horizontal context.

17. The method of claim 14, wherein calculating a vertical language feature of the first token based on the token and one or more tokens in rows above or below the row further comprises:

determining a width range of a line that contains the first token;

extending the width range of the line upwards and downwards to identify a vertical context of the first token, wherein the vertical context comprises lines above or below the line that contains the first token and having at least a portion within the width range;

sorting the lines in the vertical context according to a corner coordinate; and forming the vertical language features based on the sorted lines in the vertical context.

18. The method of claim 14, further comprising:

identifying an image region in the document image, the image region containing the first token;

calculating a computer vision feature of the token based on a pyramid multiresolution representation of the image region;

encoding, using a third encoder, the computer vision feature of the token into a computer vision embedding; and training the neural network model further using the computer vision embedding.

19. The method of claim 15, further comprising:

determining a token shape feature of the first token, wherein the token comprises one or more characters, and the token shape feature comprises a shape representation associated with each of the one or more character;

encoding, using a fourth encoder, the token shape feature into a token shape embedding; and training the neural network model further using the token shape embedding.

\* \* \* \* \*